US012691533B2

(12) United States Patent (10) Patent No.: US 12,691,533 B2
Yamaguchi et al. (45) Date of Patent: Jul. 28, 2026

(54) SOLDER PARTICLE MANUFACTURING METHOD, SOLDER PARTICLE, AND CONDUCTIVE COMPOSITION

(71) Applicant: DEXERIALS CORPORATION, Tochigi (JP)

(72) Inventors: Sarii Yamaguchi, Tochigi (JP); Hidetsugu Namiki, Tochigi (JP); Takeshi Nishio, Tochigi (JP)

(73) Assignee: DEXERIALS CORPORATION, Tochigi (JP)

( * ) Notice: Subject to any disclaimer, the term of this patent is extended or adjusted under 35 U.S.C. 154(b) by 301 days.

(21) Appl. No.: 18/688,455

(22) PCT Filed: Aug. 5, 2022

(86) PCT No.: PCT/JP2022/030080
§ 371 (c)(1),
(2) Date: Mar. 1, 2024

(87) PCT Pub. No.: WO2023/053722
PCT Pub. Date: Apr. 6, 2023

(65) Prior Publication Data
US 2025/0128361 A1 Apr. 24, 2025

(30) Foreign Application Priority Data

Sep. 29, 2021 (JP) ................................ 2021-159263

(51) Int. Cl.
*B23K 35/02* (2006.01)
*B23K 35/26* (2006.01)

(52) U.S. Cl.
CPC ........ *B23K 35/0244* (2013.01); *B23K 35/262* (2013.01)

(58) Field of Classification Search
None
See application file for complete search history.

(56) References Cited

U.S. PATENT DOCUMENTS 9,446,484 B2 * 9/2016 Masui .................. H05K 1/0213
2015/0008022 A1 1/2015 Masui et al.
2019/0358752 A1 11/2019 Oshima et al.

FOREIGN PATENT DOCUMENTS

JP 2504057 B2 * 6/1996
JP H10-052789 2/1998
JP 2000-094179 4/2000
JP 2004-034083 2/2004
JP 2004-209494 7/2004
(Continued)

OTHER PUBLICATIONS

International Search Report for PCT/JP2022/030080 mailed on Oct. 25, 2022.

*Primary Examiner* — Keith D. Hendricks
*Assistant Examiner* — Nikolas Takuya Pullen
(74) *Attorney, Agent, or Firm* — IPUSA, PLLC

(57) ABSTRACT

A solder particle manufacturing method includes a curing step of curing solder particles such that a hardness K of the solder particles under compressive deformation to 70% is 850 N/mm$^2$ or greater and 1,500 N/mm$^2$ or less, and a classifying step of classifying the solder particles after being cured by forcibly generating an airflow using a classifying device.

5 Claims, 4 Drawing Sheets

SIEVE: 13

SIEVE MESH OPENING: 14

SOLDER PARTICLE BOUNCED ON SIEVE: 16

SOLDER PARTICLE: 12

(56)        References Cited

FOREIGN PATENT DOCUMENTS

| | | |
|---|---|---|
| JP | 2010-131605 | 6/2010 |
| JP | 2014069194 A * | 4/2014 |
| JP | 2016-056288 | 4/2016 |
| JP | 6439893 | 12/2018 |
| JP | 2019-042974 | 3/2019 |
| WO | 2013/125517 | 8/2013 |
| WO | WO-2021001897 A1 * | 1/2021 ............ G06Q 10/04 |

* cited by examiner

WIRING PATTERN: 10

COARSE
SOLDER PARTICLE: 11

SOLDER
PARTICLE: 12

SIEVE: 13

DEFORMED SOLDER
PARTICLE: 15

SIEVE MESH
OPENING: 14

SOLDER
PARTICLE: 12

DEFORMED SOLDER
PARTICLE: 15

DEFORMED SOLDER
PARTICLE: 15

SIEVE
: 13

SIEVE: 13

SIEVE MESH
OPENING: 14

SOLDER PARTICLE
BOUNCED ON SIEVE: 16

SOLDER PARTICLE: 12

SOLDER
PARTICLE: 12

SIEVE
: 13

SOLDER PARTICLE MANUFACTURING METHOD, SOLDER PARTICLE, AND CONDUCTIVE COMPOSITION

TECHNICAL FIELD

The present invention relates to a solder particle manufacturing method, solder particles, and a conductive composition.

BACKGROUND ART

Currently commercially-available solder particles are less uniform in particle diameter than (i.e., have a wider particle size distribution than that of) metal-coated resin particles commonly serving as conductive particles, and contain a certain amount of coarse solder particles. Hence, connecting wiring patterns using a conductive composition containing currently commercially-available solder particles may cause short-circuiting as illustrated in FIG. 1 due to a coarse solder particle 11 that is present in a portion to which no pressure is applied between the wiring patterns 10 during thermo-compression bonding and assembly. In FIG. 1, the reference numeral 12 denotes solder particles.

Hence, in order to avoid the risk of occurrence of short-circuiting, there is a classification method using a sieve as a method for removing coarse solder particles. Among such classification methods, classification using a swirling airflow sifter configured to perform classification using a sieve and an airflow is effective.

In a classification method using such a swirling airflow sifter, for example, polyamidine A (available from Mitsubishi Chemical Corporation, product name "DIACATCH (registered trademark) CHP800") and polyamidine B (available from Mitsubishi Chemical Corporation, product name "DIAFLOC (registered trademark) KP7000"), which are different types, are pulverized using a jet mill (available from Nippon Pneumatic Mfg. Co. Ltd., product name "PJM-80SP"), and classified by sifting. It is disclosed that particles that are 16 μm or less are classified using a swirling airflow sifter (available from Seishin Enterprise Co., Ltd., product name "SPIN AIR SIEVE SAR-200") (see paragraph [0114] of PTL 1).

In Example 6 of paragraph of PTL 2, it is disclosed that glass particles were treated using a sifting classifier (SPIN AIR SIEVE, obtained from Seishin Enterprise Co., Ltd.) to which a sieve having a mesh opening size of 10 μm was attached, and any glass particles that remained on the 10 μm sieve were used as glass particles –5.

CITATION LIST

Patent Literature

[PTL 1] Japanese Patent Application Laid-Open Publication No. 2019-042974
[PTL 2] Japanese Patent Application Laid-Open Publication No. 2016-056288

SUMMARY OF THE INVENTION

Technical Problem

However, the related art documents indicated above only mention that polyamidine particles or glass particles are classified using a SPIN AIR SIEVE (available from Seishin Enterprise Co., Ltd.), which is a swirling airflow sifter, and neither mention nor suggest removing coarse solder particles from solder particles using a SPIN AIR SIEVE, which is a swirling airflow sifter, and the possibility of avoiding the risk of occurrence of short-circuiting thereby.

Moreover, when a swirling airflow sifter is applied to classification of soft solder particles, solder particles 12 become deformed solder particles 15 as illustrated in FIG. 2 due to the impact when they collide with a sieve 13 (see FIG. 3A and FIG. 3B), and adhere to the sieve mesh openings 14 of the sieve 13 and clog it (see FIG. 4), leading to a problem that the productivity decreases through yield decrease.

The present invention aims for solving the various problems in the related art and achieving an object described below. That is, an object of the present invention is to provide a solder particle manufacturing method that can inhibit adherence of solder particles to a surface of a sieve during classification using a swirling airflow sifter and can aim for a higher productivity through yield improvement, solder particles that can contribute to avoiding the risk of short-circuiting, and a conductive composition containing the solder particles.

Solution to the Problem

Solutions to the problems are as follows.
<1> A solder particle manufacturing method, including:
  a curing step of curing solder particles such that a hardness K of the solder particles under compressive deformation to 70% is 850 N/mm$^2$ or greater and 1,500 N/mm$^2$ or less; and
  a classifying step of classifying the solder particles after being cured by forcibly generating an airflow using a classifying device.
<2> The solder particle manufacturing method according to <1>,
  wherein in the curing step, solder particles having a hardness K of less than 850 N/mm$^2$ under compressive deformation to 70% are cured.
<3> The solder particle manufacturing method according to <1> or <2>,
  wherein in the curing step, heating is performed in an oxygen-containing atmosphere at a temperature lower than or equal to (a melting point of the solder particles—15° C.).
<4> The solder particle manufacturing method according to any one of <1> to <3>,
  wherein the classifying is performed in an oxygen-containing atmosphere.
<5> The solder particle manufacturing method according to any one of <1> to <4>,
  wherein the classifying device is a device configured to classify the solder particles while generating the airflow by suctioning by a blower to swirl the solder particles and make the solder particles collide with a surface of a sieve.
<6> Solder particles, a hardness K of the solder particles under compressive deformation to 70% being 850 N/mm$^2$ or greater and 1,500 N/mm$^2$ or less.
<7> The solder particles according to <6>,
  wherein a number average particle diameter of the solder particles is 1 μm or greater.
<8> The solder particles according to <7>,
  wherein a proportion of coarse solder particles having a number-based particle diameter that is 1.25 times or more greater than the number average particle diameter in the solder particles is 0.5% or less.

<9> The solder particles according to <7> or <8>, including:

Sn; and at least one selected from Bi, Ag, Cu, and In.

<10> A conductive composition, including:

the solder particles of any one of <6> to <9>.

Advantageous Effects of the Invention

The present invention can solve the various problems in the related art described above, achieve the object described above, and provide a solder particle manufacturing method that can inhibit adherence of solder particles to a surface of a sieve during classification using a swirling airflow sifter and can aim for a higher productivity through classification yield improvement, solder particles that can contribute to avoiding the risk of short-circuiting, and a conductive composition containing the solder particles.

DESCRIPTION OF EMBODIMENTS (Solder Particle Manufacturing Method)

A solder particle manufacturing method according to the present invention includes a curing step of curing solder particles such that a hardness K of the solder particles under compressive deformation to 70% is 850 N/mm$^2$ or greater and 1,500 N/mm$^2$ or less, and a classifying step of classifying the solder particles after being cured by forcibly generating an airflow using a classifying device, and further includes other steps as needed.

Figure 1:
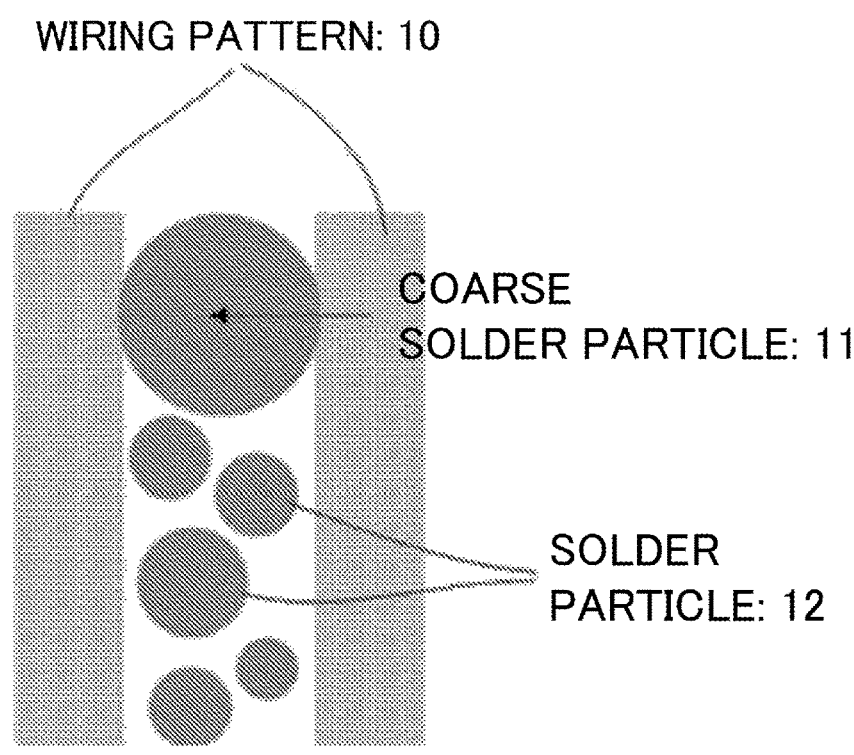
FIG. 1 is an exemplary drawing illustrating that short-circuiting occurs due to a coarse solder particle in a case where commercially available solder particles are used as conductive particles.
Figure 2:
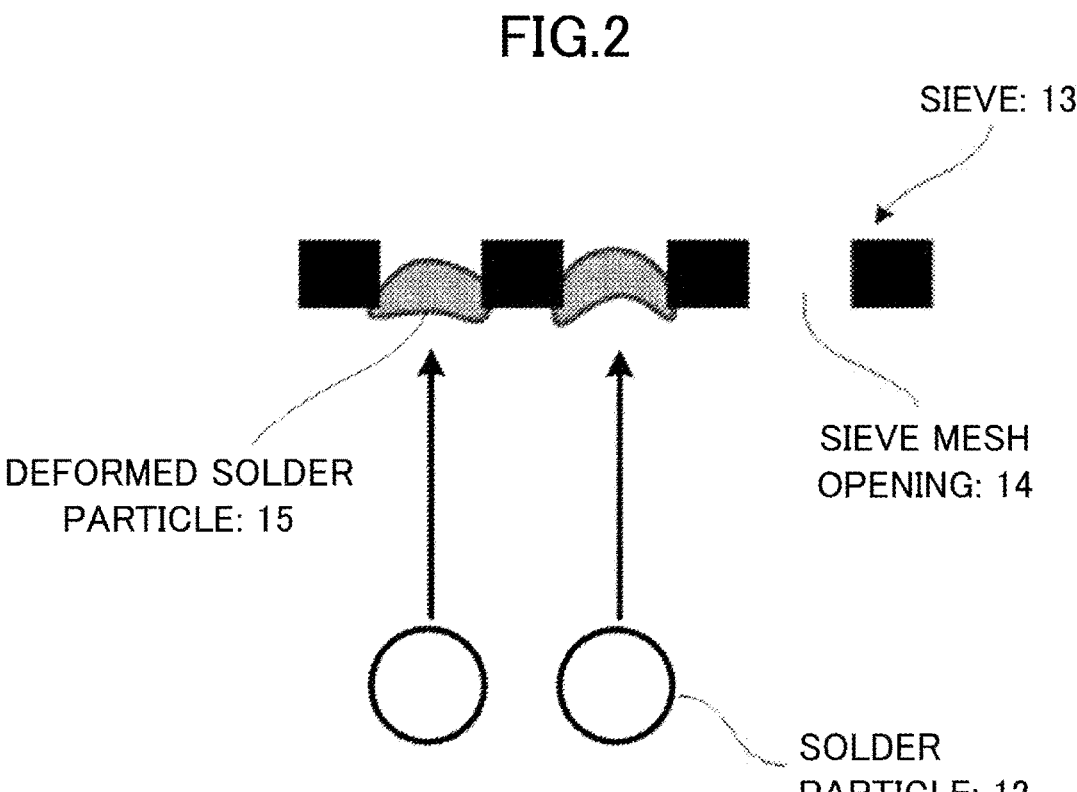
FIG. 2 is a drawing illustrating a state, during classification of soft solder particles in classification using a swirling airflow sifter, in which solder particles deform due to the impact when colliding with a sieve, resulting in adhering to the sieve mesh openings of the sieve and clogging the sieve.
Figure 3A:
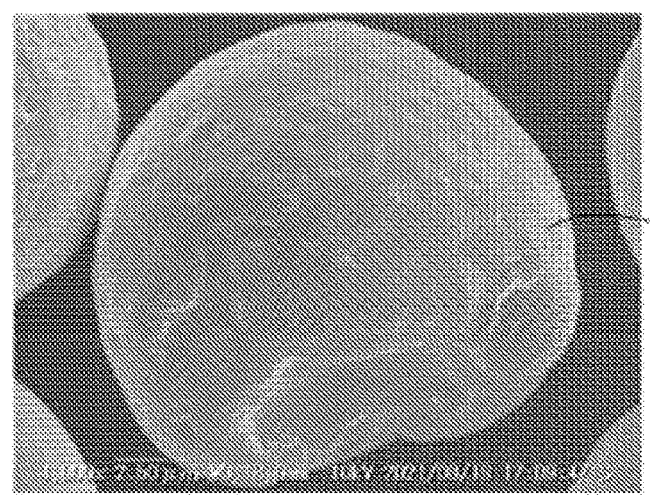
FIG. 3A is a view illustrating an example of a solder particle that has deformed upon colliding with a sieve during classification.
Figure 3B:
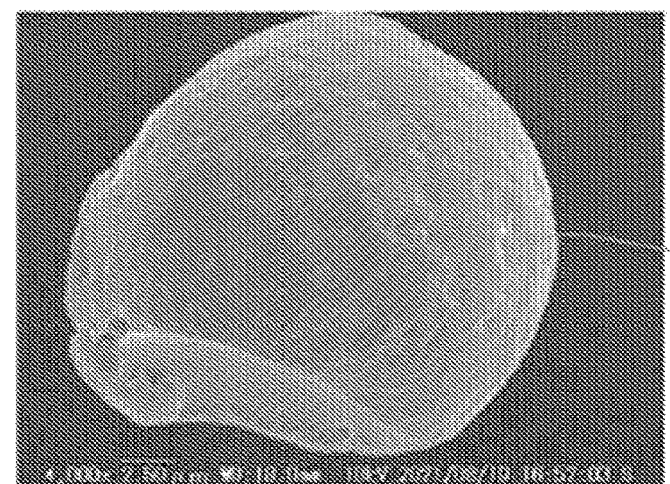
FIG. 3B is a view illustrating another example of a solder particle that has deformed upon colliding with a sieve during classification.
Figure 4:
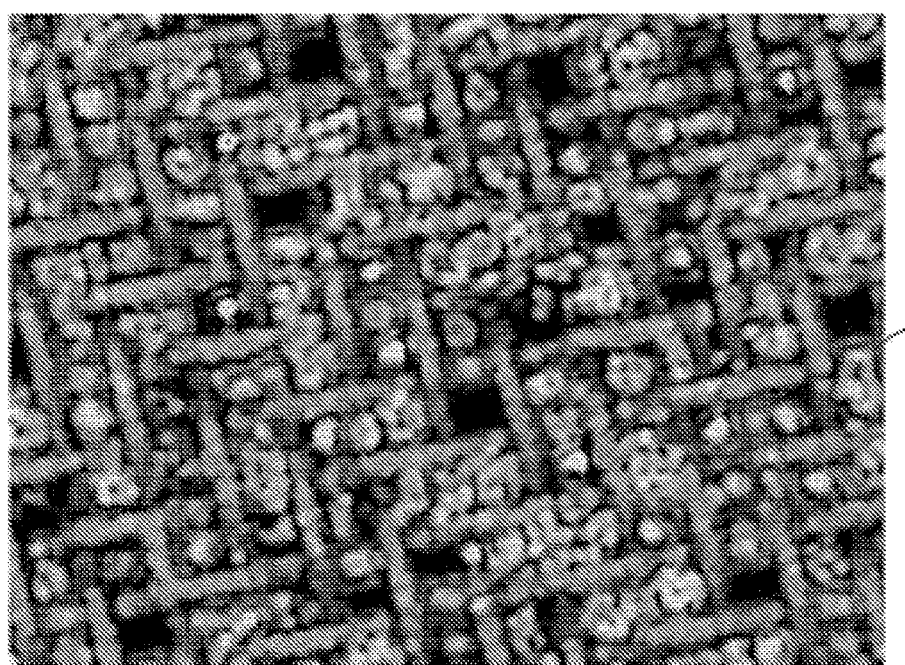
FIG. 4 is a view illustrating a sieve in a state of being clogged due to adherence of deformed solder particles to the sieve mesh openings of the sieve.
Figure 5:
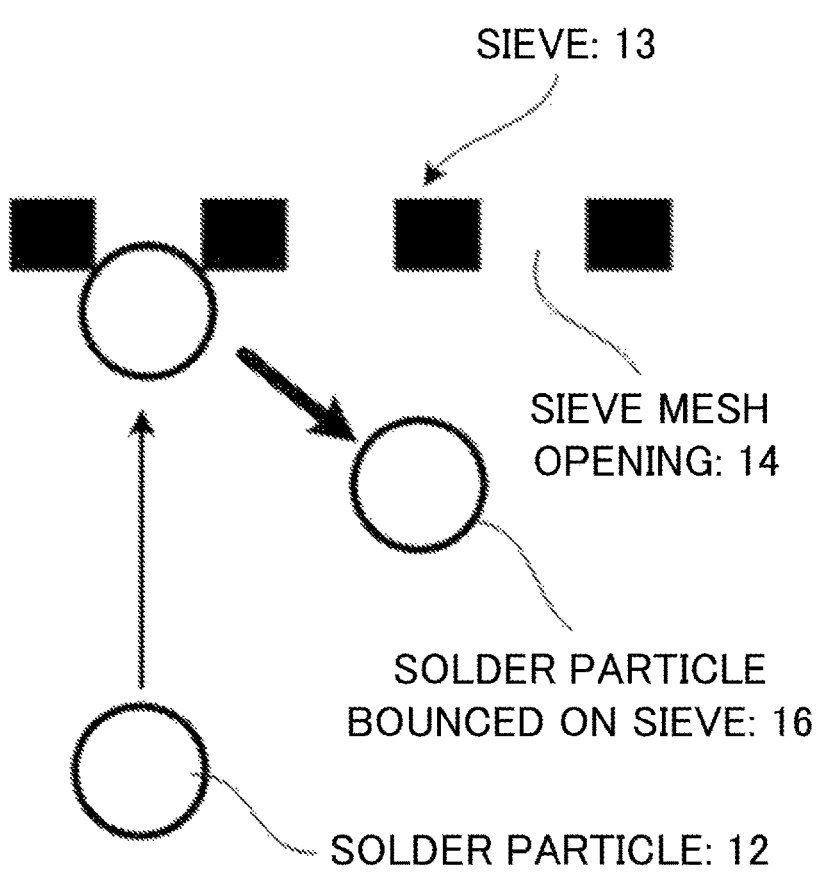
FIG. 5 is a drawing illustrating a state, during classification using a swirling airflow sifter, in which a cured solder particle collides with a sieve and is bounced upon being classified.
Figure 6:
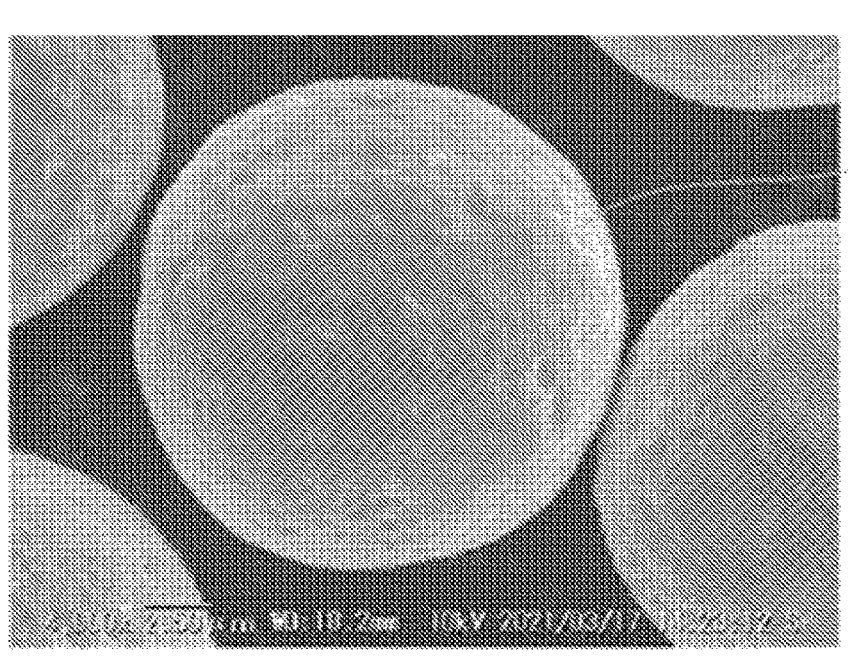
FIG. 6 is a view illustrating an example of a solder particle that is not deformed even when colliding with a sieve during classification.
Figure 7:
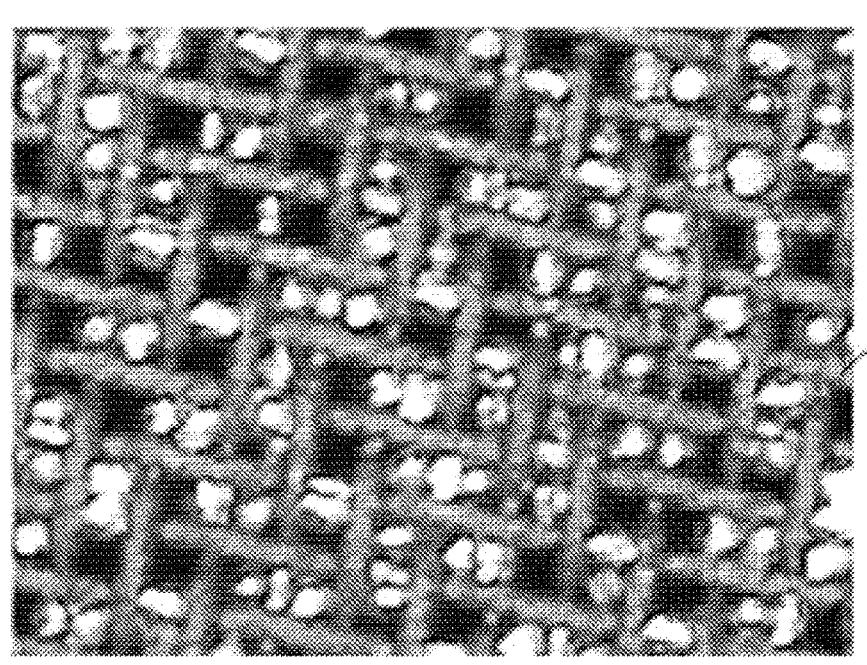
FIG. 7 is a view illustrating a sieve in a state in which no solder particles after being classified adhere to the sieve mesh openings of the sieve.

In the present invention, solder particles are cured in the curing step such that the hardness K of the solder particles under compressive deformation to 70% is 850 N/mm$^2$ or greater and 1,500 N/mm$^2$ or less. Hence, even when classified by a swirling airflow sifter, a hard solder particle 12 having collided with a sieve 13 does not deform as illustrated in FIG. 5 (see FIG. 6), but is bounced and does not adhere to a sieve mesh opening 14 of the sieve 13, keeping the sieve from being clogged (see FIG. 7). As a result, it is possible to aim for a higher productivity through improvement of the classification yield.

<Curing Step>

The curing step is a step of curing the solder particles such that the hardness K of the solder particles under compressive deformation to 70% is 850 N/mm$^2$ or greater and 1,500 N/mm$^2$ or less.

The solder particles cured in the curing step such that the hardness K of the solder particles under compressive deformation to 70% is 850 N/mm$^2$ or greater and 1,500 N/mm$^2$ or less can become less likely to deform due to the impact upon colliding with the surface of the sieve during classification by a swirling airflow sifter. Hence, it is possible to inhibit clogging of the sieve that may occur due to adherence of deformed solder particles to the surface of the sieve, and to increase the yield rate.

When the hardness K under compressive deformation to 70% is less than 850 N/mm$^2$, the yield decreases due to adherence of the solder particles to the surface of the sieve following deformation of the solder particles thereon, resulting in a low yield rate. On the other hand, when the hardness K under compressive deformation to 70% is greater than 1,500 N/mm$^2$, the yield rate increases, but the initial resistance to conduction increases due to increase in oxide film.

In the curing step, it is preferable to cure solder particles having a hardness K of less than 850 N/mm$^2$ under compressive deformation to 70%. That is, soft solder particles that have had a hardness K of less than 850 N/mm$^2$ under compressive deformation to 70% before being cured come to have a hardness K of 850 N/mm$^2$ or greater and 1,500 N/mm$^2$ or less under compressive deformation to 70% through being cured. This makes it possible to inhibit adherence of solder particles to the surface of the sieve during classification using a swirling airflow sifter.

It is possible to find the hardness K under compressive deformation to 70%, by performing a micro compression test in the manner described below.

[Micro Compression Test]

A curing degree of solder particles is measured using a micro compression tester (MCT-211, available from Shimadzu Corporation). The 70% k hardness of solder particles under compressive deformation to 70% can be calculated according to a mathematical formula (1) below.

[Math. 1]

$$K[N/mm^2] = \frac{3}{\sqrt{2}} \times F \times S^{-3/2} \times R^{-1/2} \qquad \text{Mathematical formula (1)}$$

In the mathematical formula (1), F represents the load value (N) on the solder particles under compressive deformation to 70%, S represents a compression displacement (mm), and R represents the radius (mm) of the solder particles before compressive deformation.

In the curing step, it is preferable to perform heating in an oxygen-containing atmosphere at a temperature lower than or equal to (Melting point of the solder particles—15° C.). In a specific example, heating oxidation conditions include use of an air-circulating oven in the air at a temperature of from 80° C. through 130° C. for from 1 day through 10 days.

The curing is performed in an oxygen-containing atmosphere. The oxygen concentration in the oxygen-containing atmosphere is preferably 15 vol % or higher and more preferably 20 vol % or higher. When the oxygen concentration is 15 vol % or higher, it is possible to form a firm oxide film on the surface of the solder particles. Air can be used as an oxygen-containing atmosphere having an oxygen concentration of 21 vol %.

It is possible to cure the solder particles not only by performing the heating oxidation, but also by pressure oxidation, humidified oxidation, a chemical treatment, or the like.

<Classifying Step>

The classifying step is a step of classifying the solder particles after being cured by forcibly generating an airflow using a classifying device.

As the classifying device, a device configured to classify particles while forcibly generating an airflow to disperse the particles and roughen the surface of the particles can be used. A swirling airflow sifter configured to classify solder particles while generating an airflow by suctioning by a blower to swirl the solder particles and make the solder particles collide with the surface of a sieve is preferable.

This classifying device classifies solder particles while roughening the surface of the solder particles to an undulated state due to the collision of the solder particles with the surface of the sieve. An example of such a classifying device is a SPIN AIR SIEVE (available from Seishin Enterprise Co., Ltd.), which is a swirling airflow sifter.

The suctioning pressure of the blower is preferably 0.1 MPa or higher and 1.5 MPa or lower, and more preferably 0.5 MPa or higher and 1.0 MPa or lower.

It is preferable to perform the classification in an oxygen-containing atmosphere. The oxygen concentration in the oxygen-containing atmosphere is preferably 15 vol % or higher and more preferably 20 vol % or higher. When the oxygen concentration is 15 vol % or higher, it is possible to form a firm oxide film on the surface of the solder particles even while the solder particles are being classified. Air can be used as an oxygen-containing atmosphere having an oxygen concentration of 21 vol %.

<Other Steps>

The other steps are not particularly limited and may be appropriately selected in accordance with the intended purpose. Examples of the other steps include a washing step, a drying step, and the like.

(Solder Particles)

Solder particles according to the present invention have a hardness K of 850 N/mm$^2$ or greater and 1,500 N/mm$^2$ or less, preferably 900 N/mm$^2$ or greater and 1,500 N/mm$^2$ or less, and yet more preferably 950 N/mm$^2$ or greater and 1,300 N/mm$^2$ or less under compressive deformation to 70%.

It is possible to measure the hardness K under compressive deformation to 70%, by performing a micro compression test as described above.

In the present invention, the hardness K of the solder particles under compressive deformation to 70% is 850 N/mm$^2$ or greater and 1,500 N/mm$^2$ or less. Hence, it is possible to reduce deformation of the solder particles that is due to the impact when the solder particles collide with the surface of the sieve during classification by a swirling airflow sifter, and to inhibit clogging of the sieve that occurs due to adherence of deformed solder particles to the surface of the sieve. Moreover, by classifying the solder particles using a swirling airflow sifter, it is possible to remove coarse solder particles contained in commercially available solder particles, and to avoid the risk of short-circuiting between wiring patterns due to the coarse solder particles.

Examples of the solder particles include Sn—Pb-based solder particles, Pb—Sn—Sb-based solder particles, Sn—Sb-based solder particles, Sn—Pb—Bi-based solder particles, Sn—Bi-based solder particles, Sn—Bi—Ag-based solder particles, Sn—Bi—Cu-based solder particles, Sn—Cu-based solder particles, Sn—Pb—Cu-based solder particles, Sn—In-based solder particles, Sn—Ag-based solder particles, Sn—Pb—Ag-based solder particles, Pb—Ag-based solder particles, Sn—Ag—Cu-based solder particles, and the like, which are stipulated by Japanese Industrial Standards (JIS) Z3282-1999. These may be used alone or in combination of two or more.

Among these, solder particles containing Sn and at least one selected from Bi, Ag, Cu, and In are preferable, and Sn—Bi-based solder particles, Sn—Bi—Ag-based solder particles, Sn—Bi—Cu-based solder particles, and Sn—In-based solder particles are more preferable.

The melting point of the solder particles is preferably 110° C. or higher and 240° C. or lower, and more preferably 120° C. or higher and 200° C. or lower.

The number average particle diameter of the solder particles is preferably 1 μm or greater, more preferably 5 μm or greater, yet more preferably 10 μm or greater, and particularly preferably 15 μm or greater. The upper limit of the number average particle diameter of the solder particles is preferably 30 μm or less, more preferably 25 μm or less, and yet more preferably 20 μm or less.

As the number average particle diameter of the solder particles, a particle size distribution can be expressed by a number frequency obtained by measuring approximately 10,000 particles using, for example, a dry imaging particle size distribution analyzer (Morphologi G3, available from Malvern Panalytical Ltd.).

The proportion of coarse solder particles having a number-based particle diameter that is 1.25 times or more greater than the number-average particle diameter in the solder particles is preferably 0.5% or less, more preferably 0.1% or less, yet more preferably 0.05% or less, particularly preferably 0.01% or less, and the most preferably 0%.

When the proportion of coarse solder particles having a number-based particle diameter that is 1.25 times or more greater than the number-average particle diameter in the solder particles is 0.5% or less, it is possible to avoid occurrence of short-circuiting across wiring patterns due to coarse solder particles.

(Conductive Composition)

A conductive composition according to the present invention contains the solder particles according to the present invention, preferably contains a binder, a monofunctional polymerizable monomer, an elastomer, a curing agent, and a silane coupling agent, and further contains other components as needed.

The conductive composition may be any of a film-shaped conductive film or a paste-like conductive paste. In terms of ease of handling, a conductive film is preferable. Budget wise, a conductive paste is preferable. In a case where the conductive composition is a conductive film, a film free of solder particles may be laminated over a conductive film containing the solder particles.

—Solder Particles—

The solder particles according to the present invention described above are used as the solder particles.

The content of the solder particles in the conductive composition is not particularly limited and may be appropriately adjusted depending on, for example, the wiring pitch and the connection area of a connection structure.

—Binder—

The binder is not particularly limited and may be appropriately selected in accordance with the intended purpose.

Examples of the binder include phenoxy resins, epoxy resins, unsaturated polyester resins, saturated polyester resins, urethane resins, butadiene resins, polyimide resins, polyamide resins, and polyolefin resins. These binder resins may be used alone or in combination of two or more. Among these binder resins, phenoxy resins are particularly preferable in terms of film forming performance, processability, and connection reliability.

The phenoxy resins are resins synthesized from bisphenol A and epichlorohydrin. An appropriately synthesized product may be used or a commercially available product may be used. Examples of the commercially available product include product name: YP-50 (available from Tohto Kasei Co., Ltd.), YP-70 (available from Tohto Kasei Co., Ltd.), and EP1256 (available from Japan Epoxy Resins Co., Ltd.).

The content of the binder in the conductive composition is not particularly limited, may be appropriately selected in accordance with the intended purpose, and is preferably, for example, from 20% by mass through 70% by mass and more preferably from 35% by mass through 55% by mass.

—Monofunctional Polymerizable Monomer—

The monofunctional polymerizable monomer is not particularly limited and may be appropriately selected in accordance with the intended purpose so long as it contains one polymerizable group in a molecule. Examples of the monofunctional polymerizable monomer include monofunctional (meth)acrylic monomers, styrene monomers, butadiene monomers, and other olefin-based monomers containing a double bond. These monofunctional polymerizable monomers may be used alone or in combination of two or more. Among these monofunctional polymerizable monomers, monofunctional (meth)acrylic monomers are preferable in terms of adhesion strength and connection reliability.

The monofunctional (meth)acrylic monomer is not particularly limited and may be appropriately selected in accordance with the intended purpose. Examples of the monofunctional (meth)acrylic monomer include: acrylic acid or esters thereof, such as acrylic acid, methyl acrylate, ethyl acrylate, propyl acrylate, n-butyl acrylate, isobutyl acrylate, n-octyl acrylate, n-dodecyl acrylate, 2-ethylhexyl acrylate, stearyl acrylate, 2-chloroethyl acrylate, and phenyl acrylate; and methacrylic acid or esters thereof, such as methacrylic acid, methyl methacrylate, ethyl methacrylate, propyl methacrylate, n-butyl methacrylate, isobutyl methacrylate, n-octyl methacrylate, n-dodecyl methacrylate, 2-ethylhexyl methacrylate, stearyl methacrylate, phenyl methacrylate, dimethyl aminoethyl methacrylate, and diethyl aminoethyl methacrylate. These monofunctional (meth)acrylic monomers may be used alone or in combination of two or more.

The content of the monofunctional polymerizable monomer in the conductive composition is not particularly limited, may be appropriately selected in accordance with the intended purpose, and is preferably from 28 by mass through 30% by mass and more preferably from 5% by mass through 20% by mass.

—Curing Agent—

The curing agent is not particularly limited and may be appropriately selected in accordance with the intended purpose so long as it can cure the binder. For example, an organic peroxide is preferable.

Examples of the organic peroxide include lauroyl peroxide, butyl peroxide, benzyl peroxide, dilauroyl peroxide, dibutyl peroxide, benzyl peroxide, peroxydicarbonate, and benzoyl peroxide. These organic peroxides may be used alone or in combination of two or more.

The content of the curing agent in the conductive composition is not particularly limited, may be appropriately selected in accordance with the intended purpose, and is preferably 1% by mass or greater and 15% by mass or less and more preferably 38 by mass or greater and 10% by mass or less.

—Elastomer—

The elastomer is not particularly limited and may be appropriately selected in accordance with the intended purpose. Examples of the elastomer include polyurethane-based elastomers, acrylic rubbers, silicone rubbers, and butadiene rubbers. These elastomers may be used alone or in combination of two or more.

—Silane Coupling Agent—

The silane coupling agent is not particularly limited and may be appropriately selected in accordance with the intended purpose. Examples of the silane coupling agent include epoxy-based silane coupling agents, acrylic-based silane coupling agents, thiol-based silane coupling agents, and amine-based silane coupling agents.

The content of the silane coupling agent in the conductive composition is not particularly limited, may be appropriately selected in accordance with the intended purpose, and is preferably 0.5% by mass or greater and 10% by mass or less and more preferably 1% by mass or greater and 5% by mass or less.

—Other Components—

The other components are not particularly limited and may be appropriately selected in accordance with the intended purpose. Examples of the other components include an organic solvent, a bulking agent, a softener, an accelerator, an antiaging agent, a colorant (pigment and dye), and an ion-trapping agent. The addition amounts of the other components are not particularly limited and may be appropriately selected in accordance with the intended purpose.

<Use>

The solder particles and the conductive composition according to the present invention, which can avoid the risk of short-circuiting, can be used for electrical connection between electrodes of various connection-target components such as connection between a flexible printed circuit and a glass substrate (Film on Glass (FOG)), connection between a semiconductor chip and a flexible printed circuit (Chip on Film (COF)), connection between a semiconductor chip and a glass substrate (Chip on Glass (COG)), connection between a flexible printed circuit and a glass epoxy substrate (Film on Board (FOB)), and the like.

EXAMPLES

The present invention will be described below by way of Examples. The present invention should not be construed as being limited to these Examples.

In Examples and Comparative Examples below, "hardness K (70% K) under compressive deformation to 70%", "particle size distribution", "SEM observation of the surface of solder particles", "measurement of endothermic peak of solder particles by DSC", "sieve clogging percentage after classification", and "yield" were measured or performed, and evaluated.

<Measurement of Hardness K (70% k) Under Compressive Deformation to 70%>

The curing degree of the solder particles was measured using a micro compression tester (MCT-211, obtained from Shimadzu Corporation). The hardness K (70% K) of the solder particles under compressive deformation to 70% was calculated according to a mathematical formula (1) below.

[Math. 2]

$$K[N/mm^2] = \frac{3}{\sqrt{2}} \times F \times S^{-3/2} \times R^{-1/2}$$

Mathematical formula (1)

In the mathematical formula (1), F represents the load value (N) on the solder particles under compressive deformation to 70%, S represents a compression displacement (mm), and R represents the radius (mm) of the solder particles before compressive deformation.

<Measurement of Particle Size Distribution>

Approximately ten thousand particles were measured using a dry imaging particle size distribution analyzer (Morphologi G3, obtained from Malvern Panalytical Ltd.), and the particle size distribution was expressed by number frequency.

<Measurement of Endothermic Peak of Solder Particles by DSC>

An endothermic peak of the solder particles by DSC was measured using a Differential Scanning calorimeter (DSC) (EXSTAR DSC6200, obtained from Seiko Instruments Inc. (SII)).

<SEM Observation of the Surface of Solder Particles>

SEM observation of the surface of solder particles was performed using a Scanning Electron Microscope (SEM) (JSM-6510A, obtained from JEOL Ltd.).

<Sieve Clogging Percentage after Classification>

The sieve after classification was observed using a microscope (SZX16, obtained from Olympus Corporation, at a magnification of 11.5×), to measure the number X of clogged sieve mesh openings out of 500 sieve mesh openings and calculate the sieve clogging percentage (%) based on X/500. The sieve clogging percentage was evaluated according to the criteria listed below.

[Evaluation Criteria]

A: The sieve clogging percentage was less than 60%.

B: The sieve clogging percentage was 60% or greater and less than 80%.

C: The sieve clogging percentage was 80% or greater.

<Yield>

The yield was calculated according to the following formula: yield (%)=(B/A)×100, based on the amount A (g) of solder particles fed into the classifying device and the amount B (g) of classified solder particles recovered after classification. The yield was evaluated according to the criteria listed below.

[Evaluation Criteria]

A: The yield was 30% or higher.

B: The yield was higher than 20% and lower than 30%.

C: The yield was 20% or lower.

Example 1

<Solder Particles>

As solder particles, $Sn_{59.9}Bi_{40}Cu_{0.1}$-Type5 (obtained from Mitsui Mining & Smelting Co., Ltd.) was prepared. The result of measuring $Sn_{59.9}Bi_{40}Cu_{0.1}$-Type5 using a dry imaging particle size distribution analyzer (Morphologi G3, obtained from Malvern Panalytical Ltd.) indicated that the particle size distribution was from 15 μm through 25 μm, that the cumulative 50% number-based particle diameter ($D_{50}$) was 20 μm, and that the proportion of coarse solder particles having a number-based particle diameter of 25 μm or greater was 7%.

<Curing of Solder Particles>

Solder particles sprinkled over an aluminum vat were put in an air-circulating oven set to 100° C., and heated and cured while being left to stand still therein for 4 days.

The obtained cured solder particles were subjected to a micro compression test, to measure the hardness K (70% K) under compressive deformation to 70%, which was 950 N/mm².

<Classification of Solder Particles>

A metallic twilled mesh sieve (obtained from Tokyo Screen Co., Ltd.) having a diameter of 200 mm and a mesh opening size of 20 μm was set on a SPIN AIR SIEVE (obtained from Seishin Enterprise Co., Ltd.), which was a swirling airflow sifter, and suctioning was performed by a blower at a suctioning pressure of 0.75 MPa. Next, the solder particles (50 g) were fed from a raw material feeding port. The device was operated in the air for 5 minutes from the feeding of the raw material until the end of the classification, and minute particles that passed through the sieve were recovered and obtained as classified solder particles (15 g) (yield: 30%).

The sieve after classification was observed using a microscope, to calculate the sieve clogging percentage, which was 40%.

The hardness K (70% K) under compressive deformation to 70% after classification was measured to be 960 N/mm².

The result of measuring the obtained classified solder particles using the dry imaging particle size distribution analyzer (Morphologi G3, obtained from Malvern Panalytical Ltd.) indicated that the proportion of coarse solder particles having a number-based particle diameter of 25 μm or greater was 0.02%. It was observed by Scanning Electron Microscopic (SEM) observation that the surface of the obtained classified solder particles was undulated. An endothermic peak of the classified solder particles measured by a Differential Scanning calorimeter (DSC) was 141° C. As a result of a SEM observation of the classified solder particles after the DSC measurement, it was observed that there was almost no mutual agglutination of the particles due to melting of the particles in the classified solder particles, compared with the unclassified solder particles.

<Production of Conductive Film>

The produced solder particles of Example 1 (5 parts by mass), and an insulating binder described below (95 parts by mass) were fed into a planetary stirrer and stirred for 1 minute, to produce a conductive composition.

Next, the conductive composition was applied over a PET film having a thickness of 50 μm and dried in an oven at 80° C. for 5 minutes, to form a tacky layer made of the conductive composition and having a thickness of 25 μm over the PET film and produce a conductive film having a width of 2.0 mm.

—Insulating Binder—

The insulating binder was prepared as an ethyl acetate/ toluene mixture solution containing a phenoxy resin (product name: YP-50, obtained from Shin Nikka Epoxy Manufacturing Co., Ltd.) (47 parts by mass), a monofunctional monomer (product name: M-5300, obtained from Toagosei Co., Ltd.) (3 parts by mass), a urethane resin (product name: UR-1400, obtained from Toyobo Co., Ltd.) (25 parts by mass), a rubber component (product name: SG80H, obtained from Nagase ChemteX Corporation) (15 parts by mass), a silane coupling agent (product name: A-187, obtained from Momentive Performance Materials Japan LLC) (2 parts by mass), and an organic peroxide (product name: NIPER BW, obtained from NOF Corporation) (3 parts by mass) such that a solid component concentration would be 50% by mass.

<Production of Connection Structure>

A substrate for evaluation (a glass epoxy substrate (FR4) having a pitch of 200 μm, a line: space ratio of 1:1, and a terminal thickness of 10 μm, and plated with Cu (base)/Ni/Au), and a FPC (a polyimide film, having a pitch of 200 μm, a line: space ratio of 1:1, and a terminal thickness of 12 μm, and plated with Cu (base)/Ni/Au) were thermocompression-bonded via the conductive film described above, to produce a connection structure.

Thermocompression bonding was performed at a temperature of 150° C. at a pressure of 2 MPa for a time of 20 sec, by pushing a tool down via a silicone rubber that was over the FPC and had a thickness of 200 μm.

<Evaluation of Conduction Property>

An initial resistance to conduction in the produced connection structure in flowing a current of 1 mA was measured using a digital multimeter (obtained from Yokogawa Electric Corporation) by a 4-terminal method, and was evaluated in accordance with the criteria listed below.

An initial insulation resistance was also measured by applying a voltage across the patterns of the connection structure, to confirm presence or absence of short-circuiting. An initial insulation resistance of $1 \times 10^5 \Omega$ or lower was evaluated as being No Good because of occurrence of short-circuiting.

[Evaluation Criteria]

A: The resistance to conduction was $1\Omega$ or lower.
B: The resistance to conduction was higher than $1\Omega$.
C: The resistance to conduction was OPEN.

Example 2

<Curing of Solder Particles>

Curing of solder particles was performed in the same manner as in Example 1, except that unlike in <Curing of solder particles> of Example 1, solder particles sprinkled over an aluminum vat were put in an air-circulating oven set to 100° C. and left to stand still therein for 2 days.

The obtained cured solder particles were subjected to a micro compression test, to measure the 70% k hardness under compressive deformation to 70%, which was 850 N/mm$^2$.

<Classification of Solder Particles>

The cured solder particles were classified by forced airflow classification in the same manner as in Example 1, to obtain classified solder particles of Example 2 (12.5 g) (yield: 25%).

The sieve after classification was observed using a microscope, to calculate the sieve clogging percentage, which was 65%.

The hardness K (70% K) under compressive deformation to 70% after classification was measured to be 860 N/mm$^2$.

The result of measuring the obtained classified solder particles using the dry imaging particle size distribution analyzer (Morphologi G3, obtained from Malvern Panalytical Ltd.) indicated that the proportion of coarse solder particles having a number-based particle diameter of 25 μm or greater was 0.01%. It was observed by Scanning Electron Microscopic (SEM) observation that the surface of the obtained classified solder particles was undulated. An endothermic peak of the classified solder particles measured by a Differential Scanning calorimeter (DSC) was 141° C. As a result of a SEM observation of the classified solder particles after the DSC measurement, it was observed that there was almost no mutual agglutination of the particles due to melting of the particles in the classified solder particles, compared with the unclassified solder particles.

<Production of Conductive Film, Production of Connection Structure, and Evaluation>

A conductive film and a connection structure were produced in the same manner as in Example 1 using the produced solder particles of Example 2, and were evaluated. The results are indicated in Table 1.

Example 3

<Curing of Solder Particles>

Curing of solder particles was performed in the same manner as in Example 1, except that unlike in <Curing of solder particles> of Example 1, solder particles sprinkled over an aluminum vat were put in an air-circulating oven set to 100° C. and left to stand still therein for 10 days.

The obtained cured solder particles were subjected to a micro compression test, to measure the hardness K (70% K) under compressive deformation to 70%, which was 1,500 N/mm$^2$.

<Classification of Solder Particles>

The cured solder particles were classified by forced airflow classification in the same manner as in Example 1, to obtain classified solder particles of Example 3 (20 g) (yield: 40%).

The sieve after classification was observed using a microscope, to calculate the sieve clogging percentage, which was 30%.

The hardness K (70% K) under compressive deformation to 70% after classification was measured to be 1,500 N/mm$^2$.

The result of measuring the obtained classified solder particles using the dry imaging particle size distribution analyzer (Morphologi G3, obtained from Malvern Panalytical Ltd.) indicated that the proportion of coarse solder particles having a number-based particle diameter of 25 μm or greater was 0.01%. It was observed by Scanning Electron Microscopic (SEM) observation that the surface of the obtained classified solder particles was undulated. An endothermic peak of the classified solder particles measured by a Differential Scanning calorimeter (DSC) was 141° C. As a result of a SEM observation of the classified solder particles after the DSC measurement, it was observed that there was almost no mutual agglutination of the particles due to melting of the particles in the classified solder particles, compared with the unclassified solder particles.

<Production of Conductive Film, Production of Connection Structure, and Evaluation>

A conductive film and a connection structure were produced in the same manner as in Example 1 using the produced solder particles of Example 3, and were evaluated. The results are indicated in Table 1.

Example 4

<Classification of Solder Particles>

Using solder particles cured in the same manner as in Example 1, a forced airflow classification process was performed in the same manner as in Example 1 except that the suctioning pressure among the classification conditions was changed to 0.5 MPa, to obtain solder particles of Example 4 (12.5 g) (yield: 25%).

The sieve after classification was observed using a microscope, to calculate the sieve clogging percentage, which was 30%.

The hardness K (70% K) under compressive deformation to 70% after classification was measured to be 955 N/mm$^2$.

The result of measuring the obtained classified solder particles using the dry imaging particle size distribution analyzer (Morphologi G3, obtained from Malvern Panalytical Ltd.) indicated that the proportion of coarse solder particles having a number-based particle diameter of 25 μm or greater was 0%. It was observed by Scanning Electron Microscopic (SEM) observation that the surface of the obtained classified solder particles was undulated. An endothermic peak of the classified solder particles measured by a Differential Scanning calorimeter (DSC) was 141° C. As a result of a SEM observation of the classified solder particles after the DSC measurement, it was observed that there was almost no mutual agglutination of the particles due to melting of the particles in the classified solder particles, compared with the unclassified solder particles.

<Production of Conductive Film, Production of Connection Structure, and Evaluation>

A conductive film and a connection structure were produced in the same manner as in Example 1 using the produced solder particles of Example 4, and were evaluated. The results are indicated in Table 2.

Example 5

<Classification of Solder Particles>

Using solder particles cured in the same manner as in Example 1, a forced airflow classification process was performed in the same manner as in Example 1 except that the suctioning pressure among the classification conditions was changed to 1 MPa, to obtain solder particles of Example 5 (12.5 g) (yield: 25%).

The sieve after classification was observed using a microscope, to calculate the sieve clogging percentage, which was 70%.

The hardness K (70% K) under compressive deformation to 70% after classification was measured to be 970 N/mm$^2$.

The result of measuring the obtained classified solder particles using the dry imaging particle size distribution analyzer (Morphologi G3, obtained from Malvern Panalytical Ltd.) indicated that the proportion of coarse solder particles having a number-based particle diameter of 25 μm or greater was 0.05%. It was observed by Scanning Electron Microscopic (SEM) observation that the surface of the obtained classified solder particles was undulated. An endothermic peak of the classified solder particles measured by a Differential Scanning calorimeter (DSC) was 141° C. As a result of a SEM observation of the classified solder particles after the DSC measurement, it was observed that there was almost no mutual agglutination of the particles due to melting of the particles in the classified solder particles, compared with the unclassified solder particles.

<Production of Conductive Film, Production of Connection Structure, and Evaluation>

A conductive film and a connection structure were produced in the same manner as in Example 1 using the produced solder particles of Example 5, and were evaluated. The results are indicated in Table 2.

Example 6

<Solder Particles>

As solder particles, Sn$_{42}$Bi$_{58}$-Type5 (obtained from Mitsui Mining & Smelting Co., Ltd.) was prepared. The result of measuring Sn$_{42}$Bi$_{58}$-Type5 using a dry imaging particle size distribution analyzer (Morphologi G3, obtained from Malvern Panalytical Ltd.) indicated that the particle size distribution was from 15 μm through 25 μm, that the cumulative 50% number-based particle diameter (D$_{50}$) was 20 μm, and that the proportion of coarse solder particles having a number-based particle diameter of 25 μm or greater was 5%.

<Curing of Solder Particles>

The solder particles sprinkled over an aluminum vat were put in an air-circulating oven set to 100° C., and heated and cured while being left to stand still therein for 1 day.

The obtained cured solder particles were subjected to a micro compression test, to measure the hardness K (70% K) under compressive deformation to 70%, which was 930 N/mm$^2$.

<Classification of Solder Particles>

The cured solder particles were classified by forced airflow classification in the same manner as in Example 1, to obtain classified solder particles of Example 6 (17.5 g) (yield: 35%).

The sieve after classification was observed using a microscope, to calculate the sieve clogging percentage, which was 40%.

The hardness K (70% K) under compressive deformation to 70% after classification was measured to be 940 N/mm$^2$.

The result of measuring the obtained classified solder particles using the dry imaging particle size distribution analyzer (Morphologi G3, obtained from Malvern Panalytical Ltd.) indicated that the proportion of coarse solder particles having a number-based particle diameter of 25 μm or greater was 0.01%. It was observed by Scanning Electron Microscopic (SEM) observation that the surface of the obtained classified solder particles was undulated. An endothermic peak of the classified solder particles measured by a Differential Scanning calorimeter (DSC) was 141° C. As a result of a SEM observation of the classified solder particles after the DSC measurement, it was observed that there was almost no mutual agglutination of the particles due to melting of the particles in the classified solder particles, compared with the unclassified solder particles.

<Production of Conductive Film, Production of Connection Structure, and Evaluation>

A conductive film and a connection structure were produced in the same manner as in Example 1 using the produced solder particles of Example 6, and were evaluated. The results are indicated in Table 2.

Comparative Example 1

<Curing of Solder Particles>

Unlike in Example 1, the solder particles were not cured. The uncured solder particles were subjected to a micro compression test, to measure the hardness K (70% K) under compressive deformation to 70%, which was 800 N/mm$^2$.

<Classification of Solder Particles>

The solder particles were classified by forced airflow classification in the same manner as in Example 1, to obtain classified solder particles of Comparative Example 1 (10 g) (yield: 20%).

The sieve after classification was observed using a microscope, to calculate the sieve clogging percentage, which was 90%.

The hardness K (70% K) under compressive deformation to 70% after classification was measured to be 810 N/mm$^2$.

The result of measuring the obtained classified solder particles using the dry imaging particle size distribution analyzer (Morphologi G3, obtained from Malvern Panalytical Ltd.) indicated that the proportion of coarse solder particles having a number-based particle diameter of 25 μm or greater was 0.01%. It was observed by Scanning Electron Microscopic (SEM) observation that the surface of the obtained classified solder particles was undulated. An endothermic peak of the classified solder particles measured by a Differential Scanning calorimeter (DSC) was 141° C. As a result of a SEM observation of the classified solder particles after the DSC measurement, it was observed that there was almost no mutual agglutination of the particles due to melting of the particles in the classified solder particles, compared with the unclassified solder particles.

<Production of Conductive Film, Production of Connection Structure, and Evaluation>

A conductive film and a connection structure were produced in the same manner as in Example 1 using the produced solder particles of Comparative Example 1, and were evaluated. The results are indicated in Table 3.

Comparative Example 2

<Curing of Solder Particles>

Solder particles of Comparative Example 2 were obtained in the same manner as in Example 1, except that solder particles cured in the same manner as in Example 1 were used, and were not classified.

<Production of Conductive Film, Production of Connection Structure, and Evaluation>

A conductive film and a connection structure were produced in the same manner as in Example 1 using the produced solder particles of Comparative Example 2, and were evaluated. The results are indicated in Table 3.

Comparative Example 3

<Curing of Solder Particles>

Curing of solder particles was performed in the same manner as in Example 1, except that unlike in <Curing of solder particles> of Example 1, solder particles sprinkled over an aluminum vat were put in an air-circulating oven set to 100° C. and left to stand still therein for 15 days.

The obtained cured solder particles were subjected to a micro compression test, to measure the hardness K (70% K) under compressive deformation to 70%, which was 1,550 N/mm$^2$.

<Classification of Solder Particles>

The cured solder particles were classified by forced airflow classification in the same manner as in Example 1, to obtain classified solder particles of Comparative Example 3 (20 g) (yield: 40%).

The sieve after classification was observed using a microscope, to calculate the sieve clogging percentage, which was 30%.

The hardness K (70% K) under compressive deformation to 70% after classification was measured to be 1,550 N/mm$^2$.

The result of measuring the obtained classified solder particles using the dry imaging particle size distribution analyzer (Morphologi G3, obtained from Malvern Panalytical Ltd.) indicated that the proportion of coarse solder particles having a number-based particle diameter of 25 μm or greater was 0%. It was observed by Scanning Electron Microscopic (SEM) observation that the surface of the obtained classified solder particles was undulated. An endothermic peak of the classified solder particles measured by a Differential Scanning calorimeter (DSC) was 141° C. As a result of a SEM observation of the classified solder particles after the DSC measurement, it was observed that there was almost no mutual agglutination of the particles due to melting of the particles in the classified solder particles, compared with the unclassified solder particles.

<Production of Conductive Film, Production of Connection Structure, and Evaluation>

A conductive film and a connection structure were produced in the same manner as in Example 1 using the produced solder particles of Comparative Example 3, and were evaluated. The results are indicated in Table 3.

TABLE 1

| | | Ex. 1 | Ex. 2 | Ex. 3 |
|---|---|---|---|---|
| Solder particles | Material | $Sn_{59.9}Bi_{40}Cu_{0.1}$ | $Sn_{59.9}Bi_{40}Cu_{0.1}$ | $Sn_{59.9}Bi_{40}Cu_{0.1}$ |
| | Particle dia. type | Type 5 | Type 5 | Type 5 |
| | Cuml. 50% number-based particle dia. ($D_{50}$) | 20 μm | 20 μm | 20 μm |
| | Prop. of coarse particles ≥25 μm in particle dia. | 7% | 7% | 7% |
| | Curing conditions | 100° C.-4 days | 100° C.-2 days | 100° C.-10 days |
| | K70% | 950 N/mm$^2$ | 850 N/mm$^2$ | 1,500 N/mm$^2$ |
| Classif. conditions | Sieve mesh opening size | 20 μm | 20 μm | 20 μm |
| | SUC pressure | 0.75 MPa | 0.75 MPa | 0.7 5 MPa |
| classified solder particles | Yield | A (30%) | B (25%) | A (40%) |
| | Sieve clogging percentage | A (40%) | B (65%) | A (30%) |
| | Prop. of coarse particles ≥25 μm in particle dia. | 0.02% | 0.01% | 0.01% |
| | K70% | 960 N/mm$^2$ | 860 N/mm$^2$ | 1,500 N/mm$^2$ |
| Evaluation | Initial conduction evaluation | A | A | B |

TABLE 1-continued

|  |  | Ex. 1 | Ex. 2 | Ex. 3 |
|---|---|---|---|---|
| Initial insulation evaluation (Pres. or Abs. of occur. of short-circuiting |  | No occur. of short-circuiting | No occur. of short-circuiting | No occur. of short-circuiting |

TABLE 2

|  |  | Ex. 4 | Ex. 5 | Ex. 6 |
|---|---|---|---|---|
| Solder particles | Material | $Sn_{59.9}Bi_{40}Cu_{0.1}$ | $Sn_{59.9}Bi_{40}Cu_{0.1}$ | $Sn_{42}Bi_{58}$ |
|  | Particle dia. type | Type 5 | Type 5 | Type 5 |
|  | Cuml. 50% number-based particle dia. ($D_{50}$) | 20 μm | 20 μm | 20 μm |
|  | Prop. of coarse particles ≥25 μm in particle dia. | 7% | 7% | 5% |
|  | Curing conditions | 100° C.-4 days | 100° C.-4 days | 100° C.-1 day |
|  | K70% | 950 N/mm$^2$ | 950 N/mm$^2$ | 930 N/mm$^2$ |
| Classif. conditions | Sieve mesh opening size | 20 μm | 20 μm | 20 μm |
|  | SUC pressure | 0.5 MPa | 1 MPa | 0.75 MPa |
| Classified solder particles | Yield | B (25%) | B (25%) | A (35%) |
|  | Sieve clogging percentage | A (30%) | B (70%) | A (40%) |
|  | Prop. of coarse particles ≥25 μm in particle dia. | 0.00% | 0.05% | 0.01% |
|  | K70% | 955 N/mm$^2$ | 970 N/mm$^2$ | 940 N/mm$^2$ |
| Evaluation | Initial conduction evaluation | A | A | A |
|  | Initial insulation evaluation (Pres. or Abs. of occur. of short-circuiting | No occur. of short-circuiting | No occur. of short-circuiting | No occur. of short-circuiting |

TABLE 3

|  |  | Comp. Ex. 1 | Comp. Ex. 2 | Comp. Ex. 3 |
|---|---|---|---|---|
| Solder particles | Material | $Sn_{59.9}Bi_{40}Cu_{0.1}$ | $Sn_{59.9}Bi_{40}Cu_{0.1}$ | $Sn_{59.9}Bi_{40}Cu_{0.1}$ |
|  | Particle dia. type | Type 5 | Type 5 | Type 5 |
|  | Cuml. 50% number-based particle dia. ($D_{50}$) | 20 μm | 20 μm | 20 μm |
|  | Prop. of coarse particles ≥25 μm in particle dia. | 7% | 7% | 7% |
|  | Curing conditions | Not cured | 100° C.-4 days | 100° C.-15 days |
|  | K70% | 800 N/mm$^2$ | 950 N/mm$^2$ | 1.550 N/mm$^2$ |
| Classif. conditions | Sieve mesh opening size | 20 μm | Not classified | 20 μm |
|  | SUC pressure | 0.75 MPa |  | 0.75 MPa |
| Classified solder particles | Yield | C (20%) | — | A (40%) |
|  | Sieve clogging percentage | C (90%) | — | A (30%) |
|  | Prop. of coarse particles ≥25 μm in particle dia. | 0.01% | — | 0.00% |
|  | K70% | 810 N/mm$^2$ | — | 1,550 N/mm$^2$ |

TABLE 3-continued

|  |  | Comp. Ex. 1 | Comp. Ex. 2 | Comp. Ex. 3 |
|---|---|---|---|---|
| Evaluation | Initial conduction evaluation | A | A | C |
|  | Initial insulation evaluation (Pres. or Abs. of occur. of short-circuiting | No occur. of short-circuiting | No occur. of short-circuiting | No occur. of short-circuiting |

From the results in Table 1 to Table 3, it was revealed that in all of Examples 1 to 6, the hardness K (70% K) under compressive deformation to 70% was 850 N/mm$^2$ or greater and 1,500 N/mm$^2$, and that the initial resistance to conduction and the initial insulation resistance were both obtained as favorable values.

In Comparative Example 1, it was confirmed that the yield was 20%, and that the sieve clogging percentage was 90% and most of the sieve mesh openings were clogged with solder particles through classification.

In Comparative Example 2, the initial resistance to conduction was good, whereas short-circuiting occurred in the measurement of the initial insulation resistance. As a result of observing the gap between the patterns of the channel through which the short-circuiting occurred, a portion in which an abnormally-shaped solder resulting from solder particles melting and growing coarser was present was observed.

In Comparative Example 3, the yield was boosted because the hardness K (70% K) under compressive deformation to 70% was greater than 1,500 N/mm$^2$, but the initial resistance to conduction increased due to increase in oxide film instead.

INDUSTRIAL APPLICABILITY

The solder particles and the conductive composition obtained by the solder particle manufacturing method according to the present invention can avoid the risk of short-circuiting, and can hence be favorably used for, for example, connection of a terminal of a Flexible Printed Circuit (FPC) or an IC chip with an Indium Tin Oxide (ITO) electrode formed over a glass substrate of a LCD panel, connection of COF with PWB, connection of TCP with PWB, connection of COF with a glass substrate, connection of COF with COF, connection of an IC substrate with a glass substrate, connection of an IC substrate with PWB, and the like.

The present international application claims priority to Japanese Patent Application No. 2021-159263 filed Sep. 29, 2021. The entire contents of Japanese Patent Application No. 2021-159263 is incorporated herein by reference.

REFERENCE SIGNS LIST

10 wiring pattern
11 coarse solder particle
12 solder particle
13 sieve
14 sieve mesh opening
15 deformed solder particle
16 solder particle bounced on a sieve

The invention claimed is:

1. A solder particle manufacturing method, comprising:
curing solder particles such that a hardness K of the solder particles under compressive deformation to 70% is 850 N/mm$^2$ or greater and 1,500 N/mm$^2$ or less; and
classifying the solder particles after being cured by forcibly generating an airflow using a classifying device.

2. The solder particle manufacturing method according to claim 1,
wherein in the curing, solder particles having a hardness K of less than 850 N/mm$^2$ under compressive deformation to 70% are cured.

3. The solder particle manufacturing method according to claim 1,
wherein in the curing, heating is performed in an oxygen-containing atmosphere at a temperature lower than or equal to (a melting point of the solder particles-15° C.).

4. The solder particle manufacturing method according to claim 1,
wherein the classifying is performed in an oxygen-containing atmosphere.

5. The solder particle manufacturing method according to claim 1,
wherein the classifying device is a device configured to classify the solder particles while generating the airflow by suctioning by a blower to swirl the solder particles and make the solder particles collide with a surface of a sieve.

* * * * *